US010002529B2

(12) United States Patent
Ruch et al.

(10) Patent No.: US 10,002,529 B2
(45) Date of Patent: Jun. 19, 2018

(54) OPERATING TABLE SYSTEM

(71) Applicant: MAQUET GMBH, Rastatt (DE)

(72) Inventors: Juergen Ruch, Offenburg (DE);
Markus Buerstner, Karlsruhe (DE);
Winfried Boeske, Karlsruhe (DE);
Dorothee Rathmann, Buehl (DE);
Sebastian Schmoll, Rastatt (DE);
Matthias Kobuss, Gernsbach (DE);
Bapio Bamouni, Rheinstetten (DE);
Heiko Kottmann, Rastatt (DE)

(73) Assignee: MAQUET GMBH, Rastatt (DE)

( * ) Notice: Subject to any disclaimer, the term of this patent is extended or adjusted under 35 U.S.C. 154(b) by 322 days.

(21) Appl. No.: 14/938,253

(22) Filed: Nov. 11, 2015

(65) Prior Publication Data
US 2016/0078755 A1    Mar. 17, 2016

Related U.S. Application Data

(63) Continuation of application No. PCT/EP2014/061666, filed on Jun. 5, 2014.

(30) Foreign Application Priority Data

Jun. 6, 2013    (DE) .................. 10 2013 105 825

(51) Int. Cl.
*A61G 7/08*    (2006.01)
*A61G 13/10*    (2006.01)
(Continued)

(52) U.S. Cl.
CPC .............. *G08C 23/04* (2013.01); *A61G 7/08* (2013.01); *A61G 7/1046* (2013.01); *A61G 13/06* (2013.01);
(Continued)

(58) Field of Classification Search
CPC .......... A61G 7/012; A61G 7/018; A61G 7/08; A61G 7/1019; A61G 7/1046; A61G 13/02; A61G 13/06; A61G 13/10; A61G 13/104
(Continued)

(56) References Cited

U.S. PATENT DOCUMENTS 5,477,570 A    12/1995  Hannant
7,526,823 B2 *  5/2009  Koch ................... A61G 7/1019
                                                           5/600
(Continued)

FOREIGN PATENT DOCUMENTS

CN    1973801 A    6/2007
CN    101064060 A    10/2007
(Continued)

OTHER PUBLICATIONS

English translation of Chinese Office Action and Chinese Search Report dated Nov. 16, 2016 for corresponding Chinese Patent Application No. 201480039879.9, 8 pages.
(Continued)

*Primary Examiner* — Robert G Santos

(57) ABSTRACT

An operating table system is disclosed. The operating table system has a first transmitting-receiving device that is mountable to a transport device, a second transmitting-receiving device that is mountable to an operating table column, and a coupling device that couples a patient support and the operating table column. The first transmitting-receiving device is configured to transmit a request command and a transfer command to the second transmitting-receiving device. The second transmitting-receiving device is configured to transmit a device address to the first transmitting-receiving device. The coupling device is actuated based on the second transmitting-receiving device receiving (Continued)

the request command and the transfer command and the first transmitting-receiving device receiving the device address.

20 Claims, 3 Drawing Sheets

(51) Int. Cl.
G08C 23/04 (2006.01)
A61G 7/10 (2006.01)
A61G 13/06 (2006.01)
H04B 10/112 (2013.01)

(52) U.S. Cl.
CPC .......... *A61G 13/104* (2013.01); *A61G 13/105* (2013.01); *H04B 10/112* (2013.01); *A61G 2203/12* (2013.01); *A61G 2203/72* (2013.01); *A61G 2203/80* (2013.01)

(58) Field of Classification Search
USPC ....... 5/611, 11, 600, 620, 86.1, 83.1, 81.1 R, 5/510
See application file for complete search history.

(56) References Cited

U.S. PATENT DOCUMENTS

| | | | | |
|---|---|---|---|---|
| 7,634,826 B2* | 12/2009 | Koch | ................... | A61G 7/1019 5/600 |
| 7,669,258 B2* | 3/2010 | Koch | ................... | A61G 7/1019 5/600 |
| 7,669,261 B2* | 3/2010 | Fruh | ...................... | A61G 13/02 5/613 |
| 7,757,316 B2* | 7/2010 | Koch | ................... | A61G 7/1019 5/600 |
| 7,810,185 B2* | 10/2010 | Burstner | ................ | A61G 13/02 5/600 |
| 8,249,457 B2* | 8/2012 | Ruch | ...................... | A61G 13/02 398/100 |
| 9,409,753 B2* | 8/2016 | Kobuss | ................ | A61G 13/104 |
| 9,480,615 B2* | 11/2016 | Eisenmann | .......... | A61G 13/104 |
| 9,582,997 B2* | 2/2017 | Ruch | ....................... | G08C 17/02 |
| 2007/0101500 A1* | 5/2007 | Fruh | ....................... | A61G 13/02 5/613 |
| 2007/0107123 A1* | 5/2007 | Koch | ................... | A61G 7/1019 5/509.1 |
| 2007/0107124 A1* | 5/2007 | Koch | ................... | A61G 7/1019 5/510 |
| 2007/0107126 A1* | 5/2007 | Koch | ...................... | A61G 13/02 5/600 |
| 2007/0110448 A1 | 5/2007 | Ruch | | |
| 2007/0118989 A1* | 5/2007 | Koch | ................... | A61G 7/1019 5/600 |
| 2009/0119842 A1* | 5/2009 | Koch | ................... | A61G 7/1019 5/600 |
| 2014/0130258 A1* | 5/2014 | Kobuss | ................ | A61G 13/104 5/620 |
| 2014/0130259 A1* | 5/2014 | Eisenmann | .......... | A61G 13/104 5/620 |
| 2016/0078755 A1* | 3/2016 | Ruch | ....................... | G08C 23/04 5/611 |
| 2016/0328958 A1* | 11/2016 | Ruch | ....................... | G08C 17/02 |

FOREIGN PATENT DOCUMENTS

| | | |
|---|---|---|
| DE | 69405288 T2 | 1/1998 |
| DE | 19751320 A1 | 5/1999 |
| DE | 19936475 A1 | 4/2000 |
| EP | 0917868 A1 | 5/1999 |
| EP | 1785119 A1 | 5/2007 |
| GB | 2277870 A | 11/1994 |
| JP | S63154027 U | 11/1988 |
| RU | 2006139970 A | 5/2008 |

OTHER PUBLICATIONS

International Search Report dated Sep. 29, 2014, issued in PCT/EP2014/061666 (with English translation).
Russian Search Report dated Nov. 23, 2017 which issued for corresponding Russian Patent Application No. 2015156504, 2 pages.

* cited by examiner

OPERATING TABLE SYSTEM

CROSS REFERENCE TO RELATED APPLICATIONS

The present application is a continuation-in-part filed under 35 U.S.C. § 111(a), and claims the benefit under 35 U.S.C. §§ 365(c) and 371 of PCT International Application No. PCT/EP2014/061666, filed Jun. 5, 2014, and which designates the United States of America, and German Patent Application No. 10 2013 105 825.6, filed Jun. 6, 2013. The disclosures of these applications are herein incorporated by reference in their entirety.

TECHNICAL FIELD

The present disclosure relates to an operating table system, for example, having a transport device for transporting a patient support, an operating table column which can be mechanically coupled to the patient support and comprising a transfer mechanism which is drivable in response to a transfer command for transferring the patient support between the transport device and the table column, and an operating unit operable for generating a transfer command.

BACKGROUND

Known operating table systems often comprise a table column and a table plate, e.g., a patient support, which can be mechanically coupled to the table column for supporting a patient. Thereby it is possible to detach the patient support from the table column, e.g. for preparing the patient for the operation outside the operating room, or for transporting the patient out of the operating room relatively quickly after an operation. Coupling and decoupling of a patient support and table column (e.g., support transfer) may include a preoperative support transfer and a postoperative support transfer.

In the case of a preoperative support transfer, a patient lying on a patient support is brought into the operation room by a transport device. The table column located in the operating room is in the retracted state such that the patient support can be arranged above the table column by the transport device. When the transport device (and thus the patient support) and the table column are arranged in a predetermined transfer configuration with respect to each other, the table column can be moved upward by a transfer mechanism included therein. Upon the upward movement, the table column contacts the patient support from below and lifts it up from the transport device. Subsequently, the transport device may be removed. The table column and the patient support fixedly locked thereto may then be suitably positioned via electric drives based on the operation to be carried out.

In the case of postoperative support transfer, the transport device is moved under the patient support. When the transport device and the table column are arranged in a predetermined transfer configuration with respect to each other, the table column is moved downward. Upon downward movement the table column and the patient support are separated from each other while the patient support is received by the transport device. Subsequently, the patient support with the patient thereon can be moved out of the operating room by the transport device.

The transfer mechanism contained in the table column by which the table column is moved for support transfer can be actuated via an operating unit. If an operator manipulates the operating unit, the operating unit generates a transfer command corresponding to the selected function by which command the transfer mechanism contained in the table column is actuated for performing transfer of the patient support between the transport device and the table column in a desired manner.

When the pre- or the postoperative support transfer is activated, the transfer command selected by the operator should be sent to the correct table column. Other table columns present in the vicinity of this correct table column should not be activated by the selected command.

In the prior art, different solutions exist for correct transmission of the transfer command to the desired table column. For example, it is possible to integrate the operating unit to be manipulated by the operator directly into the table column, as e.g. in form of an operating panel on which column functions can be selected. Thereby, confusing different table columns may be avoided. This solution, however, is very uncomfortable for the operator because the table column, and thus the operating panel integrated in the table column, are poorly accessible, in particular during support transfer.

Another known solution is the use of an operating unit with a cable connection. As in this case, the operating unit is connected to the table column via a cable, therefore a fixed assignment between operating unit and table column is maintained. The cable, however, may become an obstacle to personnel working around an operating table. Moreover, the operating unit is limited by constantly remaining within reach.

Another conventional solution is using a hand-held unit. A limitation with this solution is the possibility that the incorrect hand-held unit might be used. In order to avoid this, normally the hand-held unit is left in the operating room with the table column assigned thereto.

Finally, an operating unit in the form of a device arranged at the transport device and utilizing a mechanical connection is known. If the transport device and the table column are arranged in a correct transfer configuration with respect to one another, the device is mechanically coupled to a switch provided on the table column via a linkage. Thus pressure applied to the device is transmitted to the switch at the table column via the linkage. This solution, however, is comparatively complex due to the fact that coupling between the pedal and the switch arranged on the table column is realized via a mechanical linkage.

SUMMARY OF THE DISCLOSURE

Embodiments of the presently disclosed operating table system may provide for transmission of the transfer command to the table column in a manner that is comfortable for the operator and at the same time is reliable.

The presently disclosed operating unit may have at least one operating element arranged on the transport device and an infrared transmitter arranged on the transport device and coupled with the operating element, said infrared transmitter transmitting the transfer command as an infrared signal when the operating element is manipulated, and by an infrared receiver which receives the transfer command being arranged on the table column.

The presently disclosed operating unit may have an operating element which is manipulated by the operator for generating the transfer command and an infrared transmitter which transmits the transfer command to the table column on the transport device. Therein, the operating element and the infrared transmitter can be arranged on the transport device in a suitable manner. Thus, positioning of the infrared transmitter may be optimized with respect to the required line of sight toward the table column. For example, the infrared sensor may be arranged on the transport device such that the transfer commands may be transmitted to the table column using relatively little power. On the other hand, the position of the operating element can be freely chosen independent of the position of the infrared sensor. In particular, the operating element may thus be arranged at a position of the transport device that is ergonomically convenient for the operator. This considerably facilitates handling of the operating unit.

As embodiments of the present disclosure provide for transmission of the transfer command as an infrared signal, accidental actuation of other table columns can be avoided, due to the line of sight which is determined by the relative position of infrared transmitter and infrared receiver. For example, the infrared transmitter arranged on the transport device may transmit the infrared signal at such a low power that the infrared signal is received with an evaluable power by the infrared receiver arranged on the table column when the transport device and the table column are arranged in a predetermined transfer configuration with respect to one another in which transfer of the patient support is performed.

The operating unit may have at least one pedal switch or pedal button as an operating element. The use of a pedal switch or a pedal button may have beneficial ergonomic aspects because the operator's hands are free. This way, he/she can, for example, perform a treatment on the patient during support transfer, e.g. perform manual respiration on the patient.

In a possible embodiment, at least one operating element may comprise two monofunctional elements, each of them having only one transfer function assigned thereto, wherein the transfer function of the one element is reciprocal to the transfer function of the other element. For example, one of the elements may have the function of moving the table column upward, whereas the other element may have the function of moving the table column downward.

As an alternative, at least one operating element may comprise a bifunctional element to which two reciprocal transfer functions are assigned.

The infrared transmitter may radiate the infrared signal at a solid angle (e.g., a predetermined angle) which may be configured to remain substantially within a range of movement in which the infrared receiver arranged on the table column moves when the table column is moved relative to the transport device in a predetermined transfer configuration where the table column and transport device are positioned with respect to each other for transfer of the patient support. On the one hand, a line of sight may be present between the infrared transmitter and the infrared receiver throughout the complete movement range of the table column. On the other hand, accidental actuation of another table column may be avoided due to the solid angle (e.g., a predetermined angle) within which the infrared transmitter radiates the infrared signal.

In order to establish a paired operating state between the infrared transmitter arranged at the transport device and the infrared receiver arranged at the table column, the table column may have an infrared pairing transmitter for transmitting a column address, whereas the transport device may have an infrared pairing receiver for receiving the column address. The above mentioned paired operating state may involve a state wherein the infrared transmitter of the operating unit is tuned to (e.g., configured to communicate with) a single table column such that this table column can be addressed by the operating unit for causing actuation. In contrast to common infrared remote control systems where either a fixed pairing between the operating unit and a single table column is predefined, or where the pairing can be changed only manually, the presently disclosed system may allow for an automatic pairing in that, for example, the column address transmitted by the table column is adopted by the transport device, and is subsequently used as distinct address in a further communication with the table column.

Upon start-up of the operating unit, the infrared transmitter of the transport device may transmit a request command to the infrared receiver of the table column, said request command requesting the infrared pairing transmitter of the table column to cyclically transmit the column address, wherein the paired operating state is present when the infrared pairing receiver of the transport device cyclically receives the column address. The above start-up can, for example, be realized by a first manipulation of the operating unit by which the table column is to be actuated (e.g. is to be adjusted for support transfer). Start-up can, however, also refer to turning on the operating unit, e.g., the beginning of energy supply, if (for example) a turn-on function of this type is provided in the operating unit.

When the column address is cyclically received, the existing line of sight between the transport device and table column can be continuously monitored. If cyclic receipt of the column address is no longer present, the paired operating state may be terminated, and thereby the control function of the operating unit with respect to the table column may be suspended.

The paired operating state may be present as long as the infrared pairing receiver cyclically receives one and the same column address. It is thereby avoided that not only one but a plurality of table columns are inadvertently addressed with the operating unit. The infrared transmitter of the transport device may transmit the transfer command only if the paired operating state is present upon manipulation of the operating unit. If the operating unit is, for example, a pedal button the control command in this embodiment is transmitted to the table column as long as the pedal button is kept pressed while the paired operating state is maintained. The latter condition may be verified by cyclic receipt of the column address.

BRIEF DESCRIPTION OF THE DRAWINGS

Embodiments of the present disclosure are explained in more detail with reference to the following Figures.

DETAILED DESCRIPTION AND INDUSTRIAL APPLICABILITY

Figure 1:
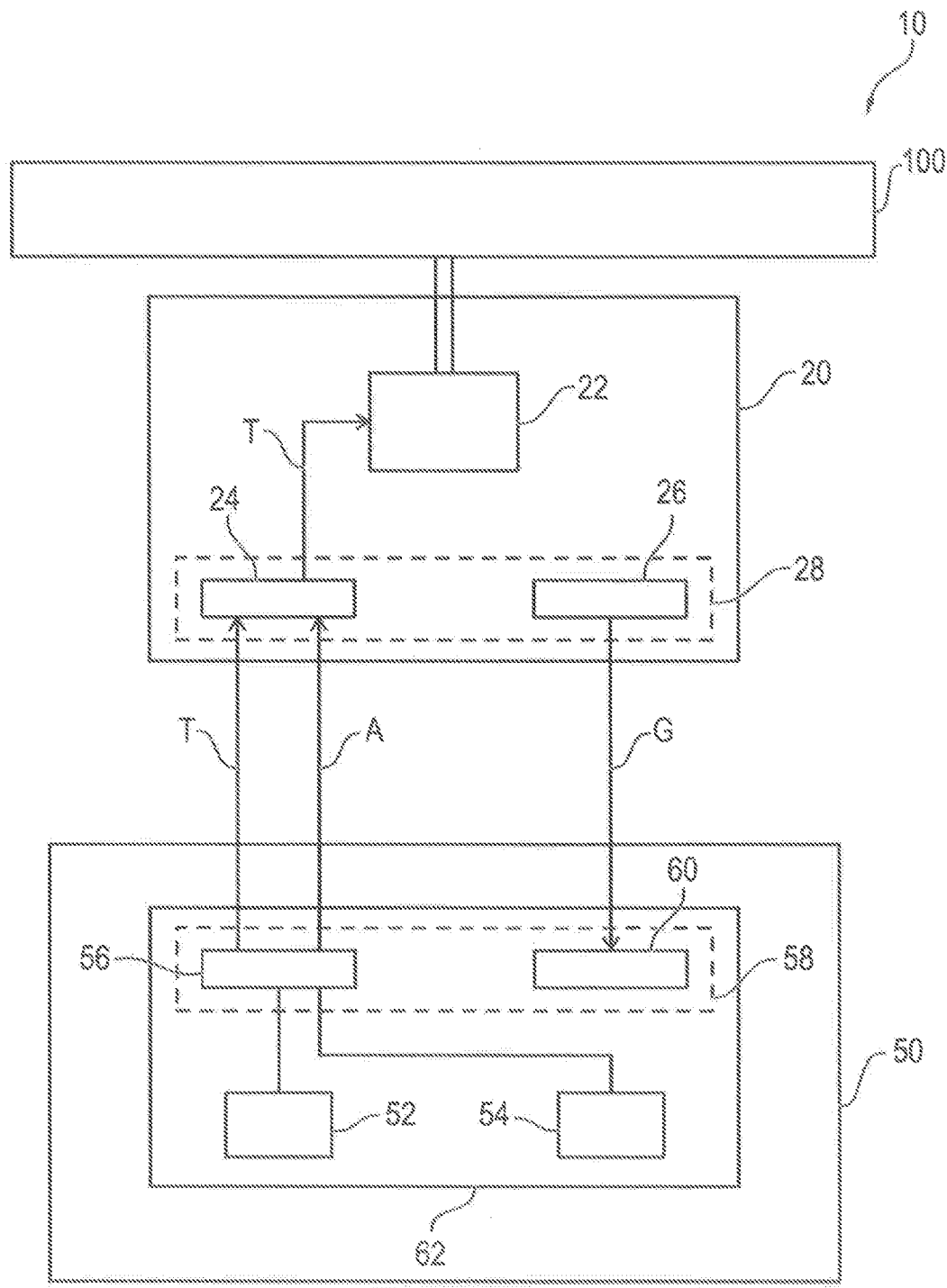
FIG. 1 is a block diagram of an operating table system according to an embodiment of the present disclosure.

FIG. 1 is a block diagram showing components of an operating table system 10. The operating table system 10 may comprise a table column 20 which can be mechanically coupled to a patient support 100, and a transport device 50 which may transport the patient support 100 to and away from the table column 20.

Two pedal buttons 52 and 54 may be arranged at the transport device 50, with the pedal buttons being coupled with an infrared sensor 56. The infrared sensor 56 may be part of a first infrared transmitting-receiving unit, generally designated by the reference sign 58. The first infrared transmitting-receiving unit 58 may include, besides the infrared transmitter 56, an infrared pairing receiver 60. The infrared transmitter 56 may be formed, for example, by a light-emitting diode which emits infrared radiation. The infrared pairing receiver 60 may be formed as a photodiode. The first infrared transmitting-receiving unit 58 and the two pedal buttons 52 and 54 may form an operating unit generally designated by reference sign 62 in FIG. 1.

The table column 20 may include a transfer mechanism 22 (e.g., a coupling device) which serves for coupling the patient support 100 with the table column 20 and decoupling it therefrom. For this purpose, both the table column 20 and the patient support 100 may have mechanical interfaces enabling mechanical coupling and decoupling.

The table column 20 may further include an infrared receiver 24, e.g. in the form of a photodiode, and an infrared pairing transmitter 26 which may be, for example, a light emitting diode. The infrared receiver 24 and the infrared pairing transmitter 26 may constitute a second infrared transmitting-receiving unit, generally designated by reference sign 28 in FIG. 1, which may communicate with the first infrared transmitting-receiving unit 58 arranged on the transport device 50 via infrared signals (e.g., provided that a line of sight is present).

For transfer of the patient support 100, the transfer mechanism 22 that may be included in the table column 20 may be actuated in accordance with a transfer command designated by the reference sign T in FIG. 1. The transfer command T may be transmitted by the infrared transmitter 56 of the first infrared transmitting-receiving unit 58 to the infrared receiver 24 of the second infrared transmitting-sending unit 28, for example, if one of the two pedal buttons 52 and 54 is operated and at the same time the infrared transmitter 56 and the infrared receiver 24 are in the paired operating state. In order to establish this paired operating state, the infrared transmitter 56 may transmit a request command, designated by the reference sign A in FIG. 1, to the infrared receiver 24 upon start-up of the operating unit 62. For example, if there is a line of sight between the infrared transmitter 56 arranged on the transport device 50 and the infrared receiver 24 arranged on the table column 20, the infrared receiver 24 may receive the request command A. For example, in this case, the infrared pairing sensor 26 that may be contained in the second infrared transmitting-receiving unit 28 may respond to the request command A by cyclically transmitting the device address designated by G in FIG. 1. This device address may be received by the infrared pairing receiver 60 contained in the first infrared transmitting-receiving unit 58.

As long as the infrared pairing receiver 60 cyclically receives one and the same device address in response to the request command A, for example, the infrared transmitter 56 arranged on the transport device 50 and the infrared receiver 24 arranged on the table column 20 may be paired. For example, as long as this paired operating state continues, the transfer command T may be received by the infrared receiver 24, and may be used in the table column 20 for actuating the transfer mechanism 22 when the pedal button 52 or 54 is operated. The transfer command T may be transmitted by the infrared transmitter 56 as an infrared signal that is suitably converted to an electric signal in the table column 20 so as to be usable for actuating the transfer mechanism 22.

Figure 2:
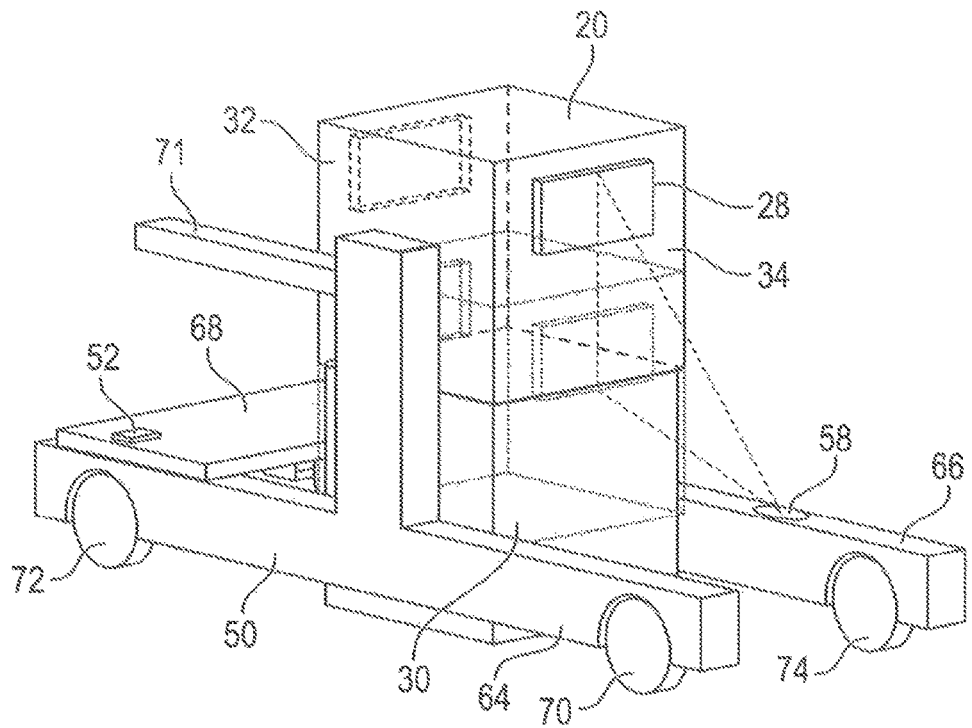
FIG. 2 is a perspective view of a configuration of a transport device and a table column.
Figure 3:
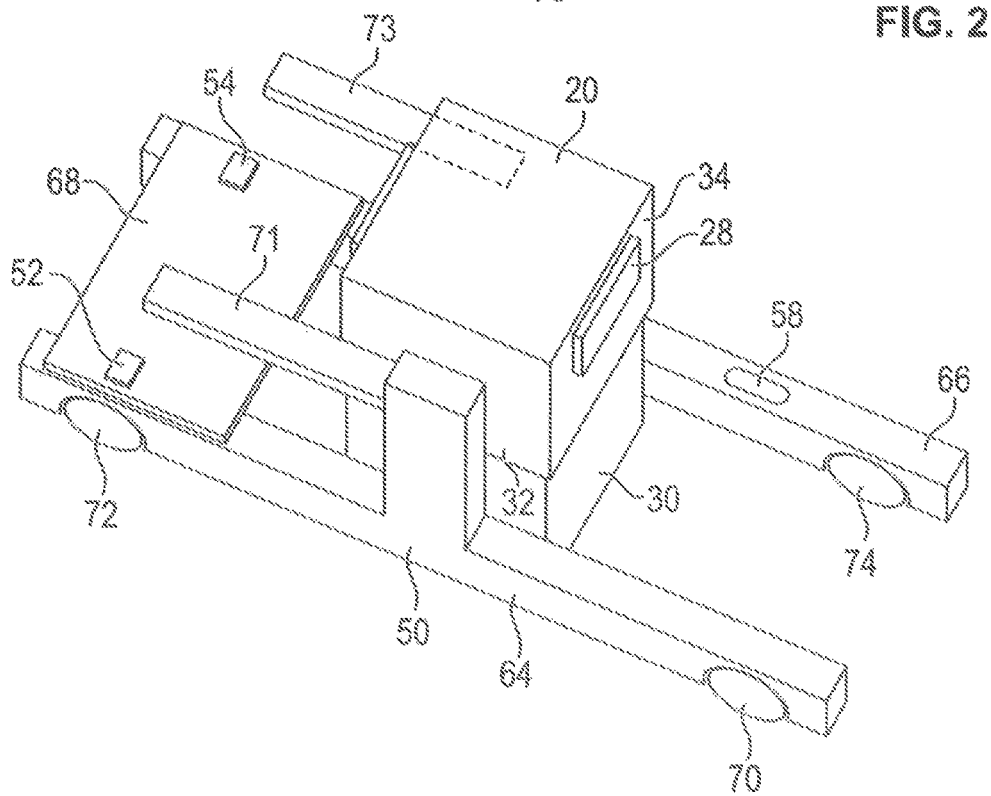
FIG. 3 is a further perspective view of the configuration according to FIG. 2.

FIGS. 2 and 3 show exemplary embodiments of the transport device 50 and the table column 20. The transport device 50 and the table column 20 in FIGS. 2 and 3 are shown in a correct transfer configuration with respect to each other in which transfer of a patient support 100 is possible.

For example, the transport device 50 may be constituted by a movable frame comprising two parallel longitudinal rails 64, 66, a cross-member 68 connecting the two longitudinal rails 64, 66 at one end of the transport device 50, and two grip parts 71 and 73 which are arranged above the two longitudinal rails 64, 66 and are parallel thereto. The transport device 50 may have four rollers which are provided in pairs at the longitudinal rails 64 and 66. In FIGS. 2 and 3 three of the four rollers are shown that are designated by 70, 72 and 74.

The table column 20 may be constituted by two column parts 30 and 32 which are telescopically slidable with respect to each another. The table column 20 can be extended and retracted in a substantially vertical direction by moving the two column parts 30 and 32 with respect to each other.

The first infrared transmitting-receiving unit 58 which may contain the infrared transmitter 56 and the infrared pairing receiver 60 may be located on the upper side of one longitudinal beam 66. The second infrared transmitting-receiving unit 28 which may contain the infrared receiver 24 and the infrared pairing transmitter 26 may be located on the upper column part 32 of the table column 20 on a side face thereof which, in the predetermined transfer configuration, may face the first infrared transmitting-receiving unit 58.

In FIG. 2 the radiation characteristic is shown at which the first infrared transmitting-sending unit 58 (e.g., the infrared transmitter 56 thereof) radiates the infrared signals towards the table column 20. The radiation characteristic is indicated by a solid angle (e.g., a predetermined angle) which may be maintained substantially within a range of movement within which the second infrared transmitting-receiving unit 28 moves in a substantially vertical direction when the two column parts 30 and 32 are moved with respect to each other for adjusting the table column 20. In FIG. 2, the exemplary upper limit of movement of the second infrared transmitting-receiving unit 28 is indicated by solid lines, and the exemplary lower limit of movement is indicated by dashed lines.

In the embodiment shown in FIG. 2, a further infrared transmitting-receiving unit may be arranged on a side face opposite the side face 34 of the upper column 32, said unit having a similar structure as the infrared transmitting-receiving unit 28. For example, there may be multiple transfer configurations of the transport device 50 and the table column 20 with respect to each other in which support transfer can be performed. Also for example, if a single correct transfer configuration is desired, the further infrared transmitting-receiving unit may be omitted.

As illustrated in FIG. 3, the two pedal buttons 52 and 54 may be located on the upper side of the cross-member 68 in the region of the longitudinal rails 64 and 66. Thus, the operator can conveniently reach them with his/her feet for activating the first infrared transmitting-receiving unit 58.

In the following exemplary embodiment, an example of a preoperative support transfer performed with the operating system 10 according to the invention is described with reference to FIGS. 4 to 9.

Figure 4:
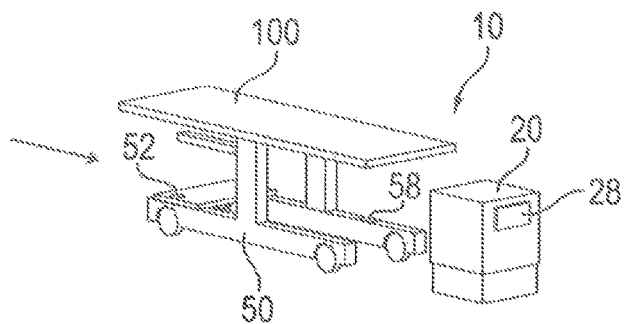
FIG. 4 is a schematic illustration showing an example embodiment of the operating table system at the beginning of a preoperative support transfer.
Figure 5:
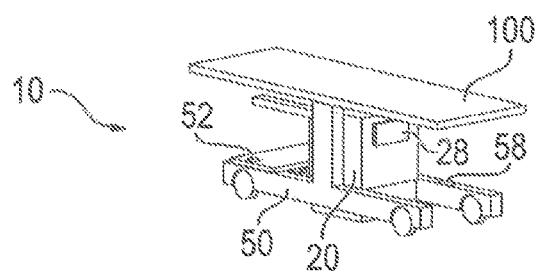
FIG. 5 is a schematic illustration showing an example embodiment of the operating table system in the transfer configuration.
Figure 6:
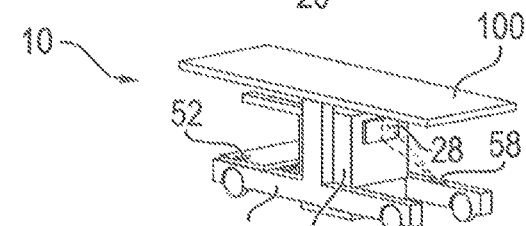
FIG. 6 is a schematic illustration showing an example embodiment of the operating table system in the course of generating a paired operating state.

FIG. 4 illustrates how the patient support 100 positioned on the transport device 50 may be moved toward the table column 50. In FIG. 5, the transport device 50 may be positioned so as to be in the predetermined transfer configuration with respect to the table column 20, which allows for transfer of the patient support 100 to the table column 20.

In this transfer configuration, the first infrared transmitting-receiving unit 58 that may be arranged on the transport device 50 and the second infrared transmitting-receiving unit 28 that may be arranged on the table column 20 may be paired by the first infrared transmitting-receiving unit 58 first sending the request command A, and the second infrared transmitting-receiving unit 28 subsequently responding by cyclic transmission of the device address G individually preset for the table column 20. This cyclic transmission of the device address G may in turn be registered by the first infrared transmitting-receiving unit 58, and it may be determined that the desired paired operating state is present.

Figure 7:
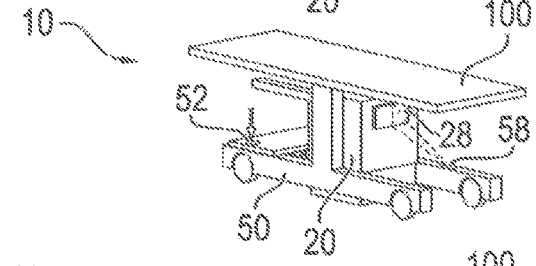
FIG. 7 is a schematic illustration showing an example embodiment of the operating table system at the beginning of patient support transfer.
Figure 8:
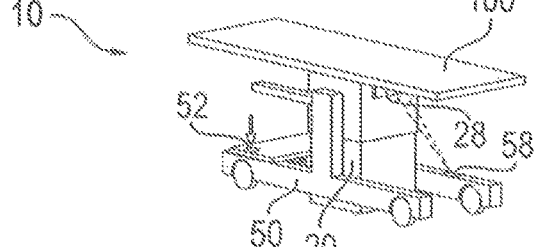
FIG. 8 is a schematic illustration showing an example embodiment of the operating table system at the end of patient support transfer.

When the two infrared transmitting-receiving units 58 and 28 are paired, the transfer command T may be transmitted from the first infrared transmitting-receiving unit 58 to the second infrared transmitting-sending unit 28 by pressing one of the two pedal buttons 52 and 54, as indicated in FIG. 7. Accordingly, as long as the pedal button 52 or 54 is pressed, the transfer mechanism 22 contained in the table column 20 may be actuated such that the table column 20 is moved vertically upward, as indicated in FIG. 8. At least one of the operating elements (for example, pedals) 52 and 54 may include two monofunctional elements (e.g., with one single transfer function being assigned to each one thereof) with the transfer function of one element being reciprocal to the transfer function of the other element. Also, at least one operating element (for example, pedals) 52 and 54 may include a bifunctional element (e.g., with two reciprocal transfer functions being assigned thereto).

Once the upper side of the table column 20 contacts the lower side of the patient support 100, the patient support 100 may be lifted from the transport device 50 and received by the table column 20. Subsequently, the patient support 100 may be fixed to the table column 20.

Figure 9:
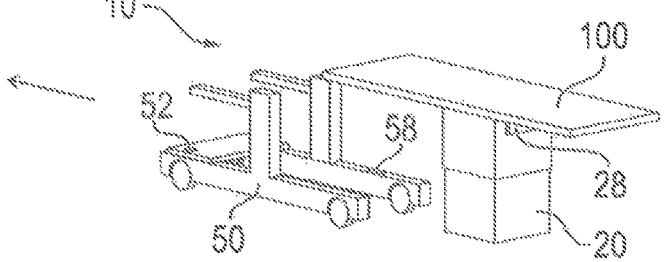
FIG. 9 is a schematic illustration showing an example embodiment of the operating table system at the end of preoperative patient support transfer.

Also, the transport device 50 may be moved away from the table column 20, as shown in FIG. 9, which may complete the preoperative support transfer.

A postoperative support transfer may be carried out similarly as described above, but for example in a reverse manner. For example, the transport device 50 may be first brought into the correct transfer configuration relative to the table column 20. Subsequently, the two infrared transmitting-receiving units 28 and 58 may be paired. Then, the transfer mechanism 22 contained in the table column 20 may be actuated by pressing the pedal button 52, 54 in order to transfer the patient support 100 to the transport device 50.

Finally, the patient support 100 that is settled on the transport device 50 may be moved away from the table column 20.

It will be apparent to those skilled in the art that various modifications and variations can be made to the disclosed method and apparatus. Other embodiments will be apparent to those skilled in the art from consideration of the specification and practice of the disclosed method and apparatus. It is intended that the specification and the disclosed examples be considered as exemplary only, with a true scope being indicated by the following claims.

What is claimed is:

1. An operating table system, comprising:
   a first transmitting-receiving device that is mountable to a transport device;
   a second transmitting-receiving device that is mountable to an operating table column; and
   a coupling device that couples a patient support and the operating table column;
   wherein the first transmitting-receiving device is configured to transmit a request command and a transfer command to the second transmitting-receiving device;
   wherein the second transmitting-receiving device is configured to transmit a device address to the first transmitting-receiving device; and
   wherein the coupling device is actuated based on the second transmitting-receiving device receiving the request command and the transfer command and the first transmitting-receiving device receiving the device address.

2. The operating table system of claim 1, wherein transmission between the first transmitting-receiving device and the second transmitting-receiving device is line of sight transmission.

3. The operating table system of claim 1, wherein the first transmitting-receiving device is configured to transmit the transfer command to the second transmitting-receiving device when an operating device is activated by an operator.

4. The operating table system of claim 3, wherein the operating device is a pedal disposed on the transport device.

5. The operating table system of claim 1, wherein the first transmitting-receiving device and the second transmitting-receiving device are infrared transmitting-receiving devices.

6. The operating table system of claim 1, wherein the coupling device is actuated based on the second transmitting-receiving device first receiving the request command, the first transmitting-receiving device then receiving the device address, and the second transmitting-receiving device then receiving the transfer command.

7. The operating table system of claim 1, wherein the second transmitting-receiving device cyclically transmits the device address to the first transmitting-receiving device.

8. The operating table system of claim 1, wherein the first transmitting-receiving device transmits the transfer command only after:
   the first transmitting-receiving device and the second transmitting-receiving device are in a paired state based on the second transmitting-receiving device having received the request command and the first transmitting-receiving device having received the device address; and
   an operating device disposed on the transport device is activated by an operator.

9. An operating table system, comprising:
   a patient support;
   a transport device that transports the patient support;
   an operating table column;

a coupling device that couples the patient support and the operating table column;

a first infrared transmitter and a first infrared receiver that are disposed on the transport device;

a second infrared transmitter and a second infrared receiver that are disposed on the operating table column; and at least one operating device disposed on the transport device;

wherein the first infrared transmitter is configured to transmit a request command to the second infrared receiver;

wherein after the second infrared receiver receives the request command, the second infrared transmitter transmits a device address to the first infrared receiver, forming a paired state between the second infrared transmitter and the first infrared receiver; and wherein the first infrared transmitter is configured to transmit a transfer command to the second infrared receiver when:

the second infrared transmitter and the first infrared receiver are in a paired state; and the at least one operating device disposed on the transport device is activated by an operator.

10. The operating table system of claim 9, wherein the at least one operating device includes two monofunctional elements, with a single transfer function being assigned to each one thereof, with the transfer function of one element being reciprocal to the transfer function of the other element.

11. The operating table system of claim 9, wherein the at least one operating device includes a bifunctional element, with two reciprocal transfer functions being assigned thereto.

12. The operating table system of claim 9, wherein the first infrared transmitter transmits an infrared signal at a predetermined angle which is configured to remain substantially within a range of movement within which the second infrared receiver moves when the operating table column is moved relative to the transport device in a predetermined transfer configuration in which the operating table column and the transport device are arranged relative to one another for transfer of the patient support.

13. The operating table system of claim 9, wherein the second infrared transmitter and the first infrared receiver remain in a paired state as long as the second infrared transmitter cyclically transmits a device address that is received by the first infrared receiver.

14. The operating table system of claim 13, wherein the device address is the operating table column address.

15. The operating table system of claim 14, wherein the second infrared transmitter and the first infrared receiver remain in a paired state only as long as the first infrared receiver cyclically receives the same operating table column address for the operating table column.

16. An operating table system, comprising:

a first line-of-sight transmitting-receiving device that is mountable to a transport device;

a second line-of-sight transmitting-receiving device that is mountable to an operating table column; and a coupling device that couples a patient support and the operating table column;

wherein the first line-of-sight transmitting-receiving device is configured to transmit a request command to the second line-of-sight transmitting-receiving device;

wherein the second line-of-sight transmitting-receiving device is configured to transmit a device address to the first line-of-sight transmitting-receiving device after receiving the request command from the first line-of-sight transmitting-receiving device; and wherein the first line-of-sight transmitting-receiving device is configured to transmit a transfer command to the second line-of-sight transmitting-receiving device after:

the first line-of-sight transmitting-receiving device has received the device address; and an operating device disposed on the transport device is activated by an operator.

17. The operating table system of claim 16, wherein the first line-of-sight transmitting-receiving device and the second line-of-sight transmitting-receiving device are infrared transmitting-receiving devices.

18. The operating table system of claim 16, wherein the operating device includes at least one pedal.

19. The operating table system of claim 16, wherein the second line-of-sight transmitting-receiving device cyclically transmits the device address to the first line-of-sight transmitting-receiving device, forming a paired state between the first line-of-sight transmitting-receiving device and the second line-of-sight transmitting-receiving device.

20. The operating table system of claim 16, wherein:

the first line-of-sight transmitting-receiving device and the second line-of-sight transmitting-receiving device remain in a paired state only as long as the first line-of-sight transmitting-receiving device cyclically receives the device address; and the device address is an operating table column address.

* * * * *